(No Model.) 2 Sheets—Sheet 1.
B. CHAMBERLAIN.
CLEANING ATTACHMENT FOR THRASHING MACHINES.
No. 269,157. Patented Dec. 12, 1882.
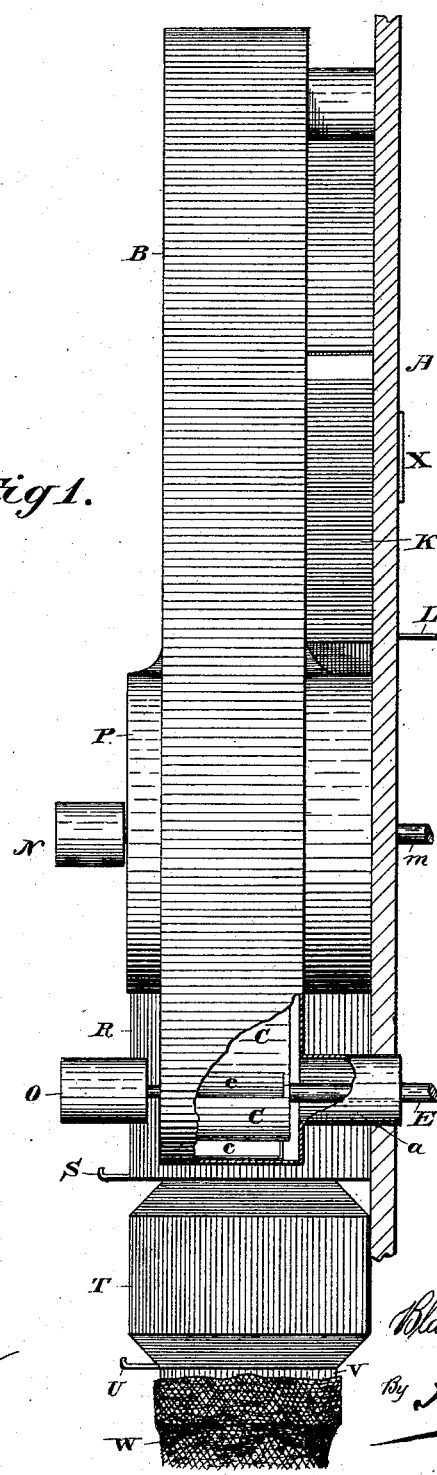

(No Model.) 2 Sheets—Sheet 2.
B. CHAMBERLAIN.
CLEANING ATTACHMENT FOR THRASHING MACHINES.
No. 269,157. Patented Dec. 12, 1882.
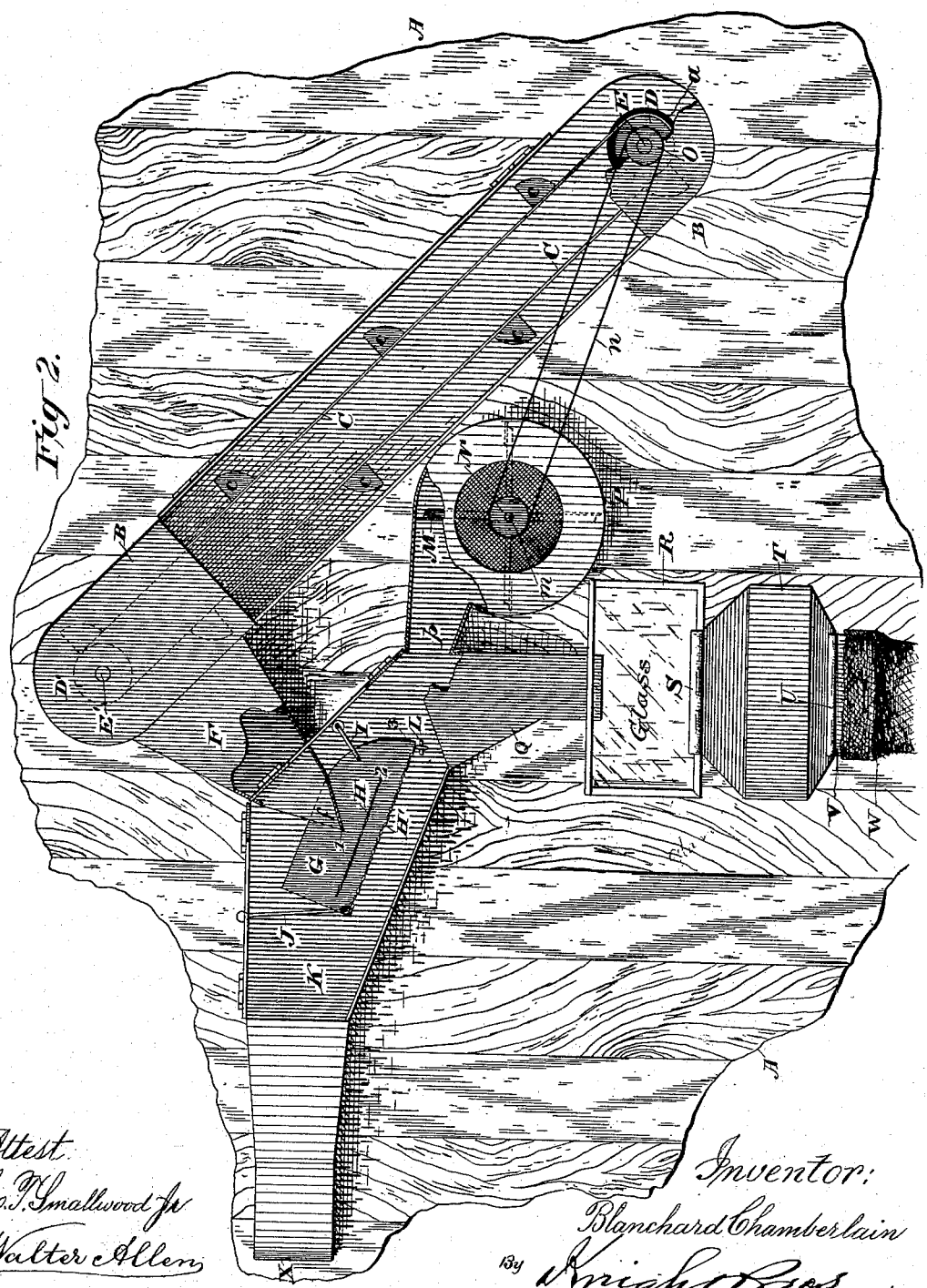

UNITED STATES PATENT OFFICE.

BLANCHARD CHAMBERLAIN, OF BELLEFONTAINE, OHIO, ASSIGNOR OF FOUR-FIFTHS TO JOSEPH H. WILSON, ROBERT LAMB, HARRY E. PALMER, AND GEORGE H. PALMER, ALL OF SAME PLACE.

CLEANING ATTACHMENT FOR THRASHING-MACHINES.

SPECIFICATION forming part of Letters Patent No. 269,157, dated December 12, 1882.

Application filed September 4, 1882. (No model.)

To all whom it may concern:

Be it known that I, BLANCHARD CHAMBERLAIN, a citizen of the United States, residing at Bellefontaine, in the county of Logan and State of Ohio, have invented an Improved Cleaning Attachment for Thrashing-Machines, of which the following is a specification.

The subject of my invention is an apparatus for direct attachment to the side of a thrashing-machine, thus forming a part thereof.

The object I have in view is to provide a simple and compact attachment by which grain can be thoroughly cleaned as it leaves the separator proper, measured and sacked, thus dispensing with a separate machine with its own running gear, as heretofore used.

My attachment is constructed with an elevator connected at bottom to the delivery spout or aperture of the thrashing-machine, and carrying the grain up to a chute, delivering the material onto a shoe shaken by connection with the riddles of the separator proper, and consisting of any suitable number of screens. The shoe delivers the grain in front of a blast of air from the mouth of a fan-chamber located in line with the shoe. After the air has passed through the grain it carries with it the matter removed from the grain through a tapering trunk and curved tube into the riddle-chamber of the machine proper. The grain drops or falls from the shoe through a chute beneath into receiving and measuring boxes. Beneath the lowest measuring-box a spout is provided for delivering the grain into a sack.

In order that my invention may be fully understood, I will proceed to describe it with reference to the accompanying drawings, in which—

Figure 1 represents an end view, showing my improved grain cleaner, measurer, and sacker attached to the side of a separator. Fig. 2 is an elevation of the attachment, the front side pieces being omitted in part.

A is the side of a thrashing-machine, having a delivery spout or aperture, a. B is a trunk, connecting at bottom with said spout or aperture, and containing an endless apron, C, provided with elevator-buckets c, and mounted on pulleys D D', secured to shafts E E', journaled respectively at the bottom and top in the trunk B, the lower shaft, E, extending through the aperture a and connected with thrasher. The buckets c deliver the grain into a chute, F, having an opening, f, at the forward side, at bottom, from which the grain falls on a shoe, G, provided with any desirable number of screens, H H'. The shoe is suspended by suitable hangers, I and J, within a trunk, K, and is shaken or vibrated by a rod, L, connected through the side of the thrasher with one of the riddles of the separator. A fan, M, driven by connection with the thrasher, or by a pulley, N, on its shaft m, driven by a band, n, connecting it with a pulley, O, on the shaft E. The fan is revolved within a casing, P, having a mouth, p, in line with the shoe, so as to deliver the air within the trunk K nearly in line with the screens H H', so that the grain is subjected to a forcible blast of air in falling from the chute F to the coarser upper screen, and in falling therefrom to the finer lower screen, and again in falling from the latter to a chute, Q, beneath the bottom of the air-trunk. The chute Q delivers into a receiving-box, R, provided with a glass front, and at bottom with a slide, S, beneath which is a measuring-box, T. The bottom of the measuring-box has a similar slide, U, by opening which the grain is delivered from the measuring-box through a spout, V, into a sack, W, below.

My attachment is applicable to the cleaning of grain of all kinds—such as wheat, barley, rye, oats, &c.—as it is thrashed. It is intended to be operated simultaneously with the thrashing-machine, thoroughly cleansing the grain and measuring and sacking it, on the side of the thrasher, ready for market, all at one operation, the air being delivered from the trunk K through the tubular mouth or exit X, turned sidewise, and discharging into the machine proper above the riddles thereof, so that any grain which is carried out by the forced blast may be returned through the thrasher.

The operation of this attachment is not affected by the direction of the wind, but operates with equal effect with the wind in any direction, which is an important practical advantage.

The upper screen of the shoe is made shorter than the lower screen, so as to provide an additional falling-point for the grain from one screen to the other. By providing a number of falling-points, 1 2 3, the apparatus exposes the grain more effectively to the action of the blast. The direction of the blast will be seen to cause it to thoroughly sweep the several screens and the floor of the inclined air-trunk K beneath them, by which means all light refuse is carried completely out of the machine.

The receiving-box R and measuring-box T are preferably made in accordance with my improvement in grain-measurers, for which Letters Patent No. 265,019, dated 26th day of September, 1882, were granted.

Having thus described my invention, the following is what I claim as new therein and desire to secure by Letters Patent:

1. The combination of trunk B, endless apron C, having buckets c, pulleys D D', shafts E E', chute F, depending from the top of trunk B, and having opening f, inclined trunk K, shoe G, suspended in said trunk K, and having screens H H', fan M, casing P, having mouth p in line with the shoe, chute Q, beneath the inclined trunk K, and exit or tube X, and spout a for connection to the side of the thrasher, as set forth.

2. The combination, with a cleaning attachment, consisting of an elevator, vibrating shoe, and rotary fan, of the receiving box R, having transparent front, and a measuring-box located beneath the receiving-box, the whole being adapted for application to the side of a thrashing-machine, as set forth.

3. In a cleaning attachment for application to the side of a thrashing-machine, the combination of an elevator, a chute, F, a shoe, G, having upper coarse shorter screen, H, and lower finer screen, H', the said chute and shoe-screens presenting falling-points 1 2 3, the fan M, casing P, having mouth p in line with the shoe, and the tube or exit X, as set forth.

4. The combination of an elevator, rotary fan, vibrating shoe, delivery-spout of thrashing-machine, blast-exit, and means for operating the parts, the elevator being connected at bottom with the delivery-spout of the thrashing-machine, its blast-exit in communication with the interior thereof, and its elevator and shoe operated thereform, as set forth.

BLANCHARD CHAMBERLAIN.

Witnesses:
E. J. HOWENSTINE,
J. O. SWEET.